United States Patent [19]

Zhang et al.

[11] Patent Number: 5,495,292

[45] Date of Patent: Feb. 27, 1996

[54] INTER-FRAME WAVELET TRANSFORM CODER FOR COLOR VIDEO COMPRESSION

[75] Inventors: Ya-Qin Zhang, Acton, Mass.; Sohail Zafar, Fairfax, Va.

[73] Assignee: GTE Laboratories Incorporated, Waltham, Mass.

[21] Appl. No.: 117,518

[22] Filed: Sep. 3, 1993

[51] Int. Cl.$^6$ .................................................. H04N 7/30
[52] U.S. Cl. ........................................................ 348/407
[58] Field of Search ....................................... 348/398, 397, 348/408, 402, 407, 416, 415, 409, 390, 384

[56] References Cited

U.S. PATENT DOCUMENTS

| | | | |
|---|---|---|---|
| 5,014,134 | 5/1991 | Lawton et al. | 358/261.3 |
| 5,067,015 | 11/1991 | Cambridge et al. | 358/133 |
| 5,206,723 | 4/1993 | Parke | 358/105 |
| 5,253,058 | 10/1993 | Gharavi | 358/136 |
| 5,309,232 | 5/1994 | Hartung et al. | 348/384 |
| 5,347,479 | 9/1994 | Miyazaki | 364/725 |
| 5,351,086 | 9/1994 | Park | 348/402 |

FOREIGN PATENT DOCUMENTS

WO9309637  5/1993  WIPO.

OTHER PUBLICATIONS

E. Adelson, "Orthogonal Pyramid Transforms for Image Coding," SPIE Visual Communication and Image Processing II, vol. 845, pp. 50☐, 1987.

P. Burt et al., "The Laplacian Pyramid as a Compact Image Code", IEEE Trans. Commun., vol. COM–31, pp. 532–540, Apr. 1983.

W. Chen et al, "Scene Adaptive Coder," IEEE Trans. Communications, pp. 225–232, Mar. 1984 (vol. COM–32, No. 3).

I. Daubechies, "Orthonormal Bases of Compactly Supported Wavelets," Communications on Pure and Applied Mathematics, 1988 vol. XL1909–996.

I. Daubechies, "The Wavelet Transform, Time–Frequency Localization and Signal Analysis," IEEE Trans. Info. Theory, vol. 36 No. 5 pp. 961–1005 Sep. 1990.

S. Mallat, "Multifrequency Channel Decompositions of Images and Wavelet Models," IEEE Trans. Acoustics, Speech and Signal Processing, vol. 3 No. 12 Dec. 1989 pp. 2091–2110.

S. Mallat, "A Theory for Multiresolution Signal Decomposition: The Wavelet Representation," IEEE Trans. on Pattern Analysis and Machine Intelligence, vol. 11 No. 7, Jul. 1989, pp. 674–693.

J. Woods and S. O'Neil, "Subband Coding of Images," IEEE Trans.Acoustics, Speech and Signal Proc. vol. ASSP–34, No. 5 pp. 1278–1288 Oct. 1986.

P. Burt, "Multiresolution techniques for image representation, analysis, and smart transmission," SPIE Visual Communications and Image Processing IV, vol. 1199, Nov. 1989 pp. 2–15.

K. Uz et al., "Interpolative Multiresolution Coding of Advanced Television with Compatible Subchannels," IEEE Trans. on Circuits and Systems for Video Technology, vol. 1, No. 1, Mar. 1991 pp. 86–99.

Zafar et al. "Predictive Block–Matching Motion Estimation Schemes for Video Compression" (Digest) IEEE Int. Conf. Consumer Electronics, Jun. 6–8 1991 FPM 21.1.

Primary Examiner—Tommy P. Chin
Assistant Examiner—Bryan S. Tung
Attorney, Agent, or Firm—Victor F. Lohmann, III; J. Stephen Yeo

[57] ABSTRACT

A video coding scheme based on wavelet representation performs motion compensation in the wavelet domain rather than spatial domain. This inter-frame wavelet transform coding scheme preferably uses a variable-size multi-resolution motion compensation (MRMC) prediction scheme. The MRMC scheme produces displaced residual wavelets (DRWs). An optimal bit allocation algorithm produces a bit map for each DRW, and each DRW is then adaptively quantized with its respective bit map. Each quantized DRW is then coded into a bit stream.

1 Claim, 6 Drawing Sheets

INTER-FRAME WAVELET TRANSFORM CODER FOR COLOR VIDEO COMPRESSION

RELATED APPLICATIONS

This application is related to copending application entitled "VARIABLE BLOCK SIZE MULTI-RESOLUTION MOTION ESTIMATION SCHEME FOR PYRAMID CODING" filed Jul. 22, 1993 as Ser. No. 08/096,148, assigned to the same assignee as the present application, and herein incorporated by reference.

BACKGROUND OF THE INVENTION

The discrete wavelet transform (DWT) has recently received considerable attention in the context of image processing due to its flexibility in representing nonstationary image signals and its ability in adapting to human visual characteristics. Its relationships to the Gabor transform, windowed Fourier transform and other intermediate spatial-frequency representations have been studied. The wavelet representation provides a multi-resolution/multi-frequency expression of a signal with localization in both time and frequency. This property is very desirable in image and video coding applications. First, natural image and video signals are nonstationary in nature. A wavelet transform decomposes a nonstationary signal into a set of multiscaled wavelets where each component becomes relatively more stationary and hence easier to code. Also, coding schemes and parameters can be adapted to the statistical properties of each wavelet, and hence coding each stationary component is more efficient than coding the whole nonstationary signal. In addition, the wavelet representation matches to the spatially-tuned, frequency modulated properties experienced in early human vision as indicated by the research results in psychophysics and physiology.

The discrete wavelet theory is found to be closely related to the framework of multiresolution analysis and subband decomposition. In the multiresolution analysis, an image is represented as a limit of successive approximations, each of which is a smoothed version of the image at the given resolution. All the smoothed versions of the image at different resolutions form a pyramid structure. An example is the so called Gaussian pyramid in which the Gaussian function is used as the smoothing filter at each step. However, there exists some redundancies among different levels of the pyramid. A Laplacian pyramid is formed to reduce the redundancy by taking the difference between the successive layers of the Gaussian pyramid. The Laplacian representation results in a considerable compression although the image size actually expands after the decomposition. In subband coding, the frequency band of an image signal is decomposed into a number of subbands by a bank of bandpass filters. Each subband is then translated to a baseband by down-sampling and encoded separately. For reconstruction, the subband signals are decoded and up-sampled back to the original frequency band by interpolation. The signals are then summed up to give a close replica of the original signal. The subband coding approach provides a compression performance comparable to the transform coding approach and yields a superior subjective perception due to the lack of the "block effect". The multiresolution approach and subband approach were recently integrated into the framework of the wavelet theory. The wavelet theory provides a systematic way to construct a set of perfect-reconstruction filter banks with a regularity condition and compact support. In the wavelet representation, the overall number of image samples is conserved after the decomposition due to the orthogonality of wavelet basis at different scales. Wavelet theory has been applied to image coding in a similar way to the subband coding approach.

Natural video signals are nonstationary in nature. In the transform coding approach such as in the CCITT H.261 the ISO/MPEG proposal, the residual video signals are divided into many small blocks. The reason being that with small block size, it becomes feasible and advantageous to be implemented in hardware, as well as the nonstationarity of each block in the residual frame is reduced. The block transform coding approach suffers from the "blocking effect" in low bit rate applications. The wavelet decomposition provides an alternative approach in representing the nonstationary video signals and the residual signals after prediction. Compared with transform coding, the wavelet representation is more flexible and can be easily adapted to the nature of human visual system. It is also free from blocking artifacts due to the nature of its global decomposition. After wavelet decomposition, each scaled wavelet tends to have different statistical properties.

SUMMARY OF THE PRESENT INVENTION

The present invention is directed to a method of coding a video signal frame f(t), comprising the steps of: deriving a wavelet representation of said signal defined by a plurality of wavelets each corresponding to a subframe having a resolution; estimating motion vectors for each of said plurality of wavelets to produce a set of displaced residual wavelets; optimally assigning a given number of bits to each of said displaced residual wavelets to produce a respective bit map; adaptively quantizing each displaced residual wavelet using said respective bit map; and coding each quantized displaced residual wavelet into a bit stream.

DETAILED DESCRIPTION OF THE PREFERRED EMBODIMENTS

A. The Wavelet-Based Inter-frame Video Coding Scheme

The compression scheme described herein is directed to an interframe hybrid DPCM/DWT scheme. Wavelet decomposition is preferably performed on the original video samples before the motion compensation rather than on the residual video samples after motion compensation. The proposed video compression coder mainly comprises three subsystems: (1): Wavelet decomposition and reconstruction, (2): motion-compensated inter-frame prediction, and (3): Bit allocation and quantization schemes.

The principal focus of the present invention is the development of an architecture for motion estimation in the wavelet domain instead of image (spatial) domain. In particular, the signal processing to accomplish coding of the video frames is executed within the wavelet domain. The main advantages of wavelet domain motion estimation are:

(1): Global wavelet decomposition significantly reduces the "blocking effect". If motion estimation is done prior to the wavelet decomposition, the block estimation creates edges during the block edges, which has a negative impact on the filtering process of wavelet decomposition.

(2): After motion estimation, the DFD is high-pass in nature, and wavelet decomposition on a high-pass image is not effective. The wavelet decomposition on the original domain avoids such problem.

(3): Motion compensation in the wavelet domain allows flexible and adaptive motion estimation. Inter-block, intra-block, bidirectional blocks can be used during the motion estimation process. The prediction can take the following forms:
 (a): Prediction from the layer above in the pyramid;
 (b): Prediction from other wavelets at the same pyramid layer;
 (c): Prediction from the same wavelets from a previous frame or future frames; or
 (d): Prediction using a combination of the above predictions.

Figure 1:
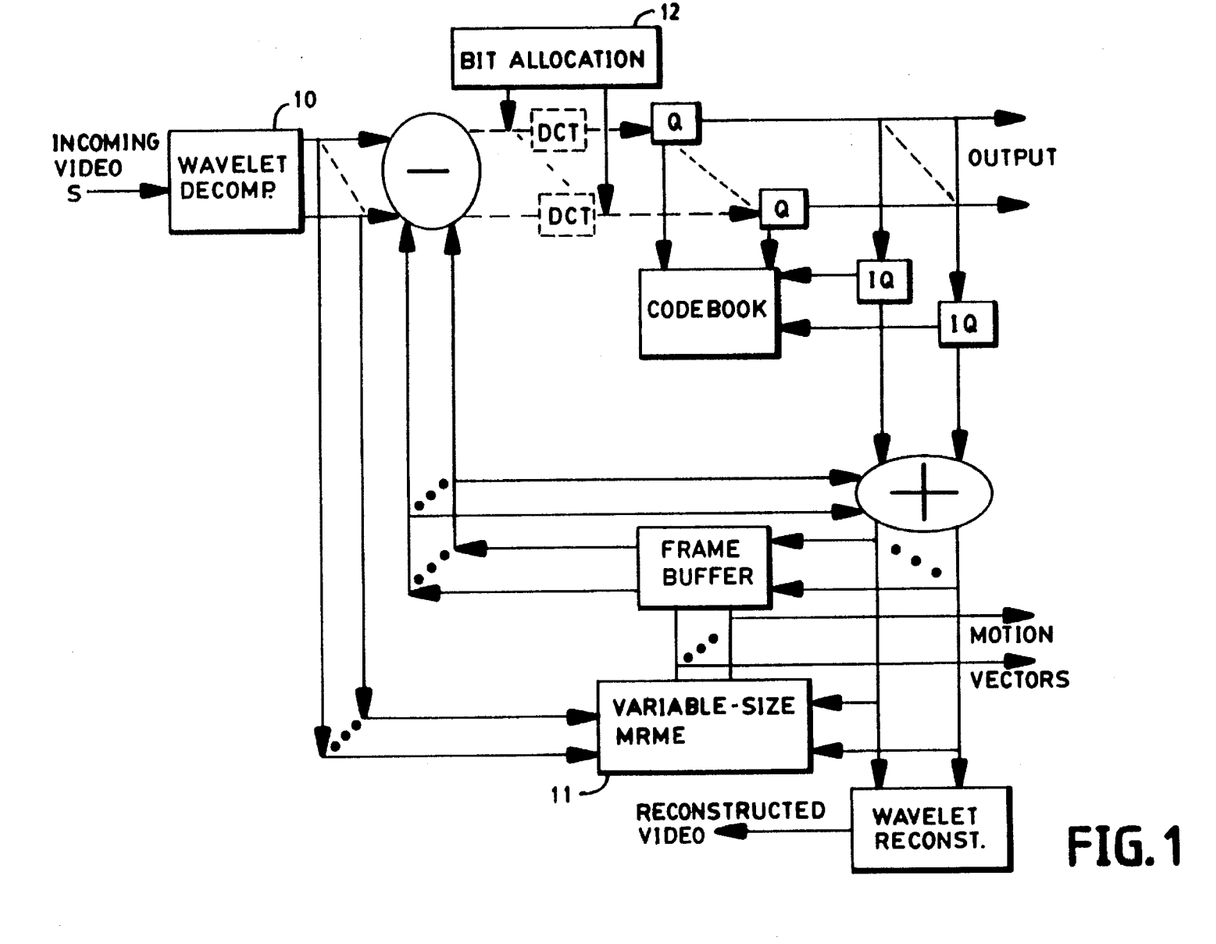
FIG. 1 is a block diagram of a coding system in accordance with a preferred embodiment of the present invention.

FIG. 1 depicts a video coding system in accordance with the present invention where original video source S is first decomposed into wavelets $\{S_M, W_m; m=1, \ldots, M \; k=1,2,3\}$. After using a motion estimation compensation scheme, the displaced wavelets residual (DRW) frames $\{R_M, R_m k: m=1, \ldots, M: k=1,2,3\}$ are coded and transmitted.

The motion estimation scheme is preferably the variable-size multi-resolution motion estimation (MRME) scheme disclosed in the aforementioned copending application entitled "VARIABLE BLOCK SIZE MULTI-RESOLUTION MOTION ESTIMATION SCHEME FOR PYRAMID CODING", herein incorporated by reference.

The energies of the DRWs may be further compacted by a mapping which intends to localize the energy distribution within each wavelet. The mapping can be any conventional transform (e.g. DCT) or a predictive coder. Of course, a simple PCM coder followed by an entropy coding is also expected to perform well. These two variations are illustrated in FIG. 1 where the dashed lines represent DCT mapping being used.

Alternatively, wavelet decomposition can take place in the residual video signal after execution of a motion-compensated prediction scheme upon the original video signal. The following four schemes designated (a)–(d) each represent a distinct signal processing methodology defined in terms of (i) the domain for wavelet decomposition and (ii) the choice of mapping strategies:

(a): Wavelet Decomposition→Multi-resolution Motion Estimation→Displaced Residual Wavelets→Multiscale Quantization→Entropy Encoder;

(b): Wavelet Decomposition→Multi-resolution Motion Estimation→Displaced Residual Wavelets→DCT→Uniform Quantization→Entropy Encoder;

(c): Motion Prediction→Displaced Frame Difference →Wavelet Decomposition→Multiscale Quantization→Entropy Encoder; and (d): Motion Prediction→Displaced Frame Difference→Wavelet Decomposition→DCT→Uniform Quantization→Entropy Encoder.

In scheme (a) shown illustratively in FIG. 1, the original video frames of signal S are first decomposed by wavelet decomposition unit 10 into wavelets of different scales and resolutions. The DRW in each scaled wavelet is then calculated using the aforementioned variable-size MRMC prediction scheme embodied in unit 11. The DRWs are then quantized by bit allocation unit 12 using the adaptive trunction process (ATP) described hereinbelow using a multiscale normalization factor. The coding chain of this scheme can be expressed as DWT/MRME/DRW/ATP. The scheme (b) also decomposes the original video frame using wavelet transform; however, the energy of the DRW frames are further compacted using a conventional DCT, and the DCT coefficients are quantized by a uniform quantizer. The coding chain of this scheme is expressed as DWT/MRMC/DRW/DCT/UQ.

Figure 2:
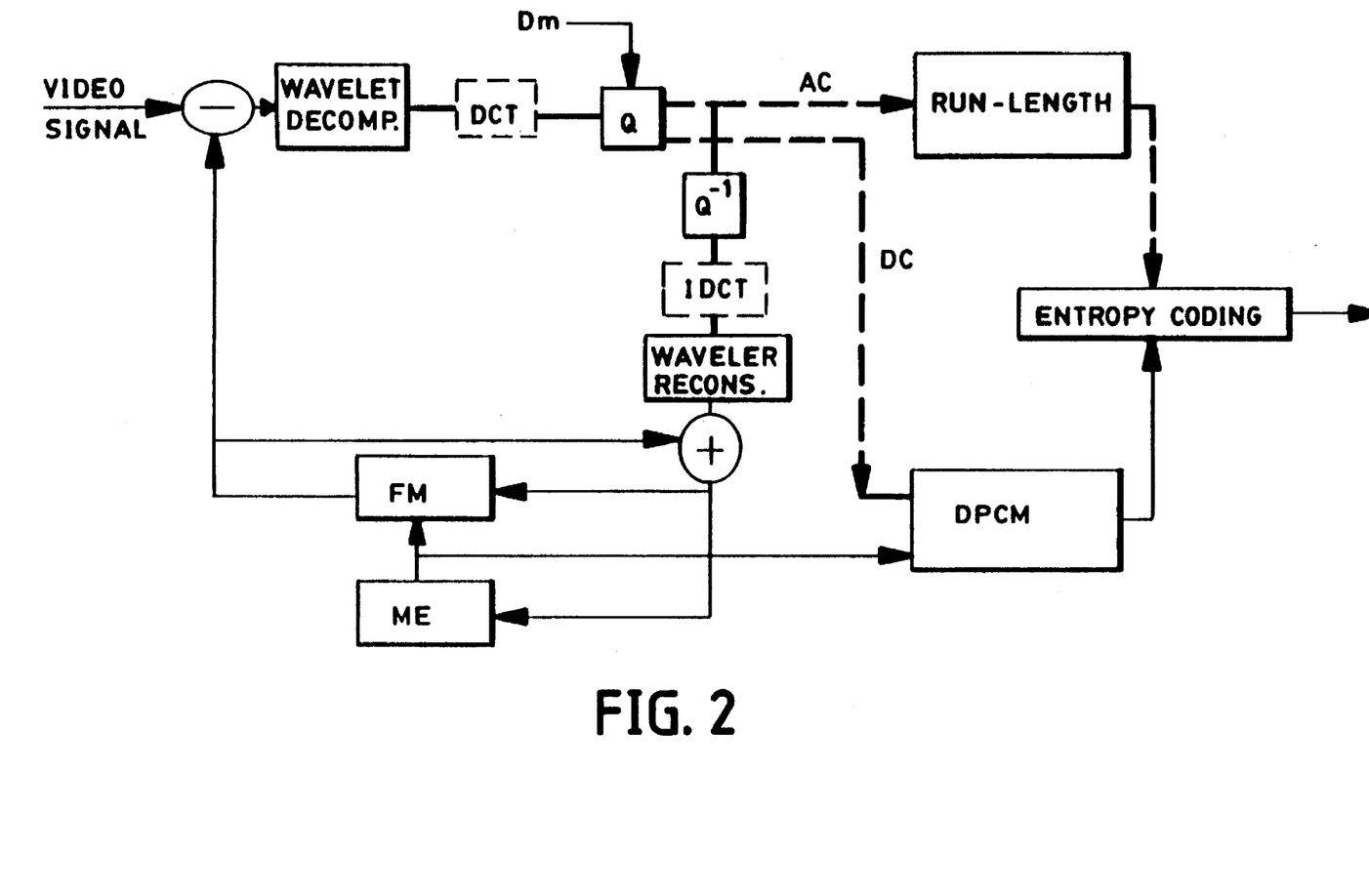
FIG. 2 is a block diagram of another embodiment of the present invention.

In schemes (c) and (d), the wavelet decomposition is performed on the residual video frame which is the displaced frame difference using a conventional motion compensated prediction scheme. A multiscale quantizer is used in scheme (c) whereas in scheme (d) DCT is used for all wavelets followed by a uniform quantizer. These strategies can be expressed as MC/DWT/ATP and MC/DWT/DCT/UQ, respectively. In all four cases, motion vectors are differential coded noiselessly and all quantities are entropy-coded prior to the transmission. FIG. 2 is a block diagram for illustrating schemes (c) and (d).

The following discussion is a general mathematical treatment of wavelet transforms used in the video coding schemes of the present invention.

B. Wavelet Decomposition and Reconstruction

A finite wavelet transform of f(t) between the scale $2^1$ and $2^M$ can be represented as:

$$\{S_{2^M}f, W_{2^M}f, W_{2^{M-1}}f, \ldots, W_{2^1}f\}$$

where $$S_{2^M}f = \langle f(t), \phi_{2^M}(t)\rangle = \int_{-\infty}^{\infty} f(t)\phi_{2^M}(t)dt$$

is the smoothed version of f(t) spanned by the scaling function at the resolution $2^M$ Relating the wavelet to the multiresolution analysis results in a fast computation algorithm useful in signal processing applications. The algorithm is described as follows:

$$m = 0$$

while $(m < M)$ $$W_{2^{m+1}}f = S_{2^m}f * G_m$$

$$S_{2^{m+1}}f = S_{2^m}f * H_m$$

$$m = m + 1$$

}

$S_1 f = f$ is the original signal.

The filter pair H and G corresponds to the expansion of the scaling function and wavelet functions, respectively. The coefficients of an orthonormal wavelet transform satisfy the following conditions:

$$\sum_n h(n) = \sqrt{2} \;,\; \sum_n g(n) = 0, g(n) = (-1)^n h(1-n). \qquad (1)$$

The reconstruction basically reverses the decomposition procedure:

$$m = M$$

$$\text{while } (m > 0)$$

$$\{$$

$$S_{2^{m-1}}f = W_{2^m}f * \tilde{G}_{m-1} + S_{2^m}f * \tilde{H}_{m-1}$$

$$m = m + 1$$

$$\}$$

where $\tilde{H}$ and $\tilde{G}$ are the conjugate filters of H and G, respectively.

Conditions in (1) are also the requirements for a class of perfect reconstruction filters, namely quadrature mirror filters (QMF) which has been used in subband image coding applications. Wavelet theory provides a systematic way to the construction of QMF. Wavelet theory also explicitly imposes a regularity condition in the QMF coefficients. The regularity condition corresponds to the degree of differntiability of the wavelet functions which is determined by the number of zeros of the wavelet filters at $\omega=\pi$. In practical applications, it is desirable to have a continuous and smooth wavelet representation, which are guaranteed by regularity conditions.

In the present invention a set of orthonormal bases is used with compactly supported wavelets developed in "Orthonormal Bases of Compactly Supported Wavelets," Comm. on Pure and Applied Mathematics, Vol. XLI, pp.909–996 (1988) by I. Daubechies, herein incorporated by reference. Compact support implies a finite length for filters H and G. There is a compromise between the degree of compactness and the degree of regularity. The wavelet function becomes more regular as the number of taps in H increases, which results in more computations. The Daubechies-6 coefficient set is used since it shows an adequate energy concentration in the low-frequency wavelets.

The extension of the 1-D wavelet transform to 2-D is straightforward. A separable wavelet transform is the one whose 2-D scaling function $\phi(t_1,t_2)$ can be expressed as $$\phi(t_1,t_2)=\phi(t_1)\phi(t_2)$$

It can be easily shown that the wavelet at a given resolution $2^m$ can be completely represented by three separable orthogonal wavelet basis functions in $L_2(R \times R)$:

$$W^1_{2^m}(t_1,t_2) = \phi_{2^m}(t_1)w_{2^m}(t_2)$$

$$W^2_{2^m}(t_1,t_2) = w_{2^m}(t_1)\phi_{2^m}(t_2)$$

$$W^3_{2^m}(t_1,t_2) = \phi_{2^m}(t_1)w_{2^m}(t_2)$$

Therefore, a 2-D dyadic wavelet transform of image f(x,y) between the scale $2^1$ and $2^M$ can be represented as a sequence of subimages:

$$\{S_{2^M}f, [W^j_{2^M}f]_{j=1,2,3}, \ldots, [W^j_{2^1}f]_{j=1,2,3}\}$$

Figure 3:
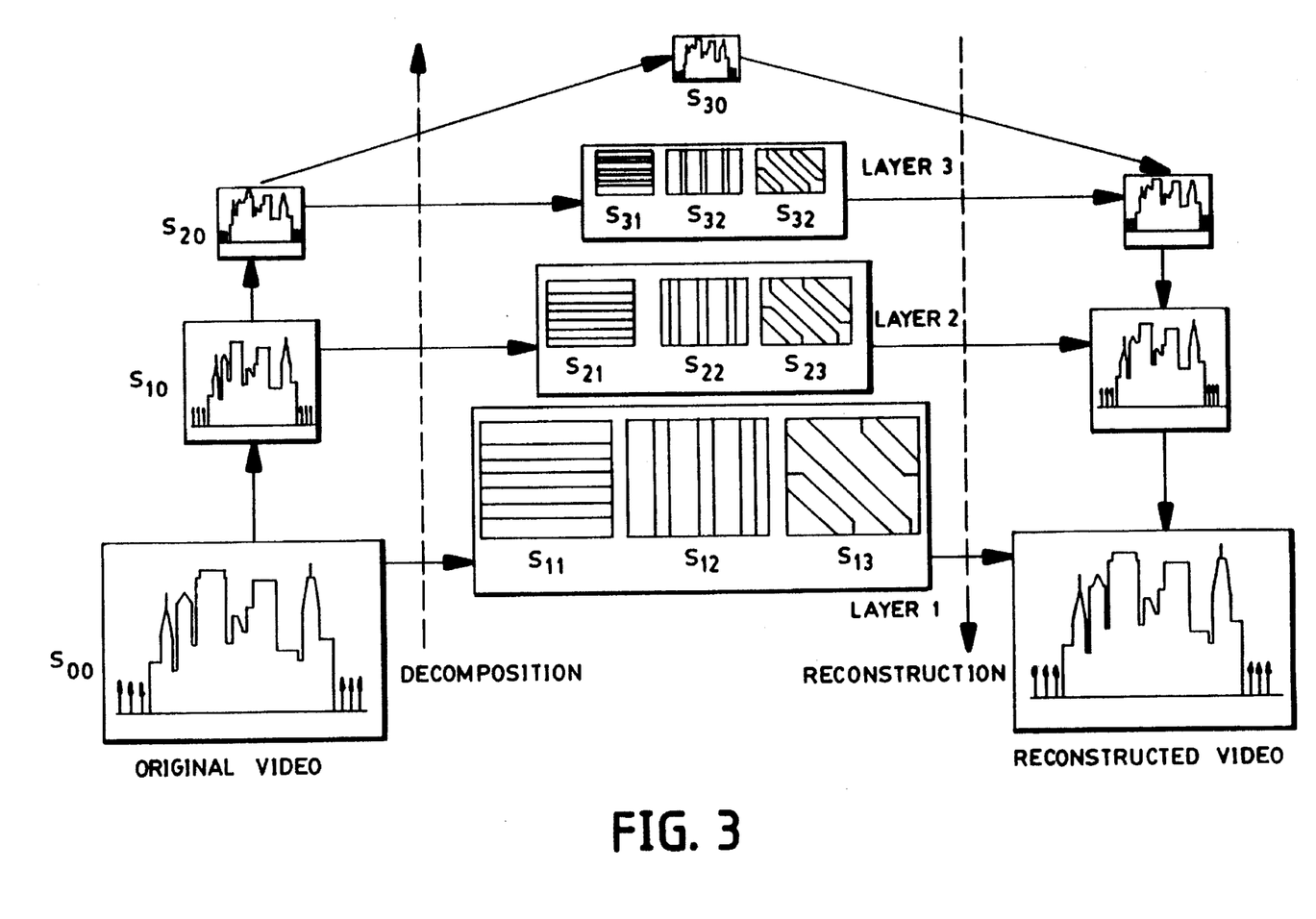
FIG. 3 shows a pyramid structure for illustrating wavelet decomposition and reconstruction.
Figure 4:
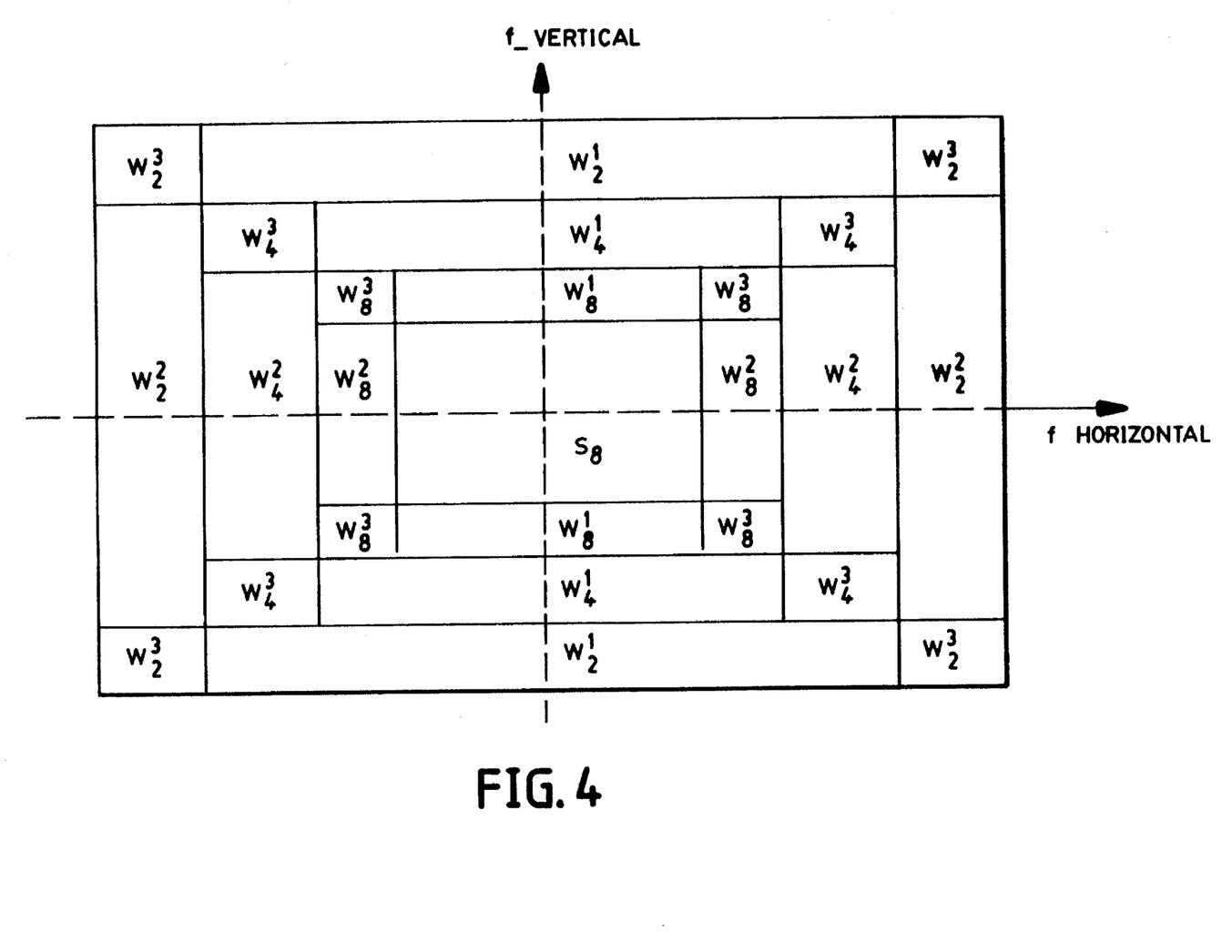
FIG. 4 shows a frequency band distribution of wavelet decompositions.

The 2-D separable wavelet decomposition can be implemented first in column and then in row independently. The decomposed image data structure and the corresponding frequency bands are depicted in FIG. 3 and 4, respectively. In FIG. 3, the decomposed image forms a pyramid structure up to three layers with three wavelets in each layer. The resolution decreases by a factor of 4 (2 in horizontal and 2 in vertical directions) with each layer increased.

C. Bit Allocation and Quantization

Two schemes are used to quantize the DRW video signals. The first method uses a bit allocation scheme followed by a uniform quantizer, wherein a proper weighting factor is added to each wavelet according to its importance in the pyramid. The second scheme is similar to the adaptive truncation process described by Chen et al. in "Scene Adaptive Coder," IEEE Trans. Comm. pp. 225–232 (1984), but uses a multi-scaled normalization factor that is determined by the weighting factor of each DRW.

In the bit allocation process, bits are first assigned among each wavelet, and then the assigned number of bits is distributed within each individual wavelet. If the expression $\{R_m^k; m=1, \ldots, M; k=1,2,3\}$ is chosen to represent the number of bits associated with wavelets $\{W_m^k m=1,\ldots,M; k=1,2,3\}$ and $R_M$ is the number of bits for wavelet $S_M$, then the total number of bits R is:

$$R = R_M + \sum_{m=1}^{M} \sum_{k=1}^{3} R_m^k \qquad (2)$$

The assignment should be done as to minimize the overall distortion in the reconstructed image, which is represented as:

$$D = 2^{2M}D_M + \sum_{m=1}^{M} \sum_{k=1}^{3} 2^{2m}D_m^k \qquad (3)$$

where $\{D_m^k; m=1, \ldots, M; k=1,2,3\}$ is the distortion associated with wavelets $\{W_m k; m=1,\ldots,M; k=1,2,3\}$ and $D_M$ represents the distortion introduced in wavelet $S_M$. Appropriate weighting factor $2^{2m}$ is introduced in the following equation, where the errors incurred in higher layer wavelets are weighed to have stronger impact on the overall distortion. The problem is to minimize (3) subject to the bit constraint in (2). The constrained problem can be converted to an unconstrained problem by forming the following functional:

$$J = D + \lambda R$$

where $\lambda$ is the lagrangian multiplier. The solution is obtained by taking the derivative of J with respect to $R_M$ and $(R_m^k; m=1, \ldots, M; k=1,2,3\}$ and setting it to zero.

$$J = 2^{2M}D_M + \sum_{m=1}^{M} \sum_{k=1}^{3} 2^{2m}D_m^k + \lambda \left( R_M + \sum_{m=1}^{M} \sum_{k=1}^{3} R_m^k \right)$$

If a difference distortion measure with power r is used, $$D(x)=|x-q(x)|^r, r \geq 1$$

where q(x) is the quantization of x.

After some derivation, the optimal bit allocation for each wavelet is expressed as follows:

$$R_m = \frac{R}{3M+1} - \frac{M(3M+5)}{3M+1} + \frac{2m}{r} + \frac{1}{r} \log_2 \left\{ \frac{\alpha_m}{\left[ \prod_m \alpha_m \right]^{1/(3M+1)}} \right\}$$

where $$\alpha_m^\kappa = [\int [f_m^k(x)]^{\frac{1}{r+1}} dx]^{r+1}$$

and $\{f_m^k(x); m=1, \ldots, M; k=1,2,3\}$ is the PDF associated with wavelets $\{W_m^k; m=1, \ldots, M; k=1,2,3\}$.

The result is quite intuitive, as the bit allocation is nearly uniform among all wavelets. Since the size of higher layer wavelets is much smaller than that of lower layer wavelets, this means more bits are assigned to the higher layer wavelets in terms of average bits per pixel. This is consistent with the inherent structure of the wavelet pyramid shown in FIG. 3. Bit allocation within each wavelet is the same as that used in transform coding.

A second quantization technique is based on the adaptive truncation process (ATP) of Chen et al, supra. This scheme basically involves a floating-to-integer conversion process. It was originally used for quantizing discrete cosine transform coefficients. In the present invention, this technique is modified by adjusting the normalization factor to the wavelet pyramid, and consists of three steps.

The first step is to apply a threshold to all wavelets $\{S_M, W_m^k; m=1, \ldots, M; k=1,2,3\}$ to reduce the number of coefficients to be quantized, i.e., make all the coefficients below a defined value zero. It should be pointed out that the dynamic range of the values in different wavelets of the DWR varies and highly depends on the motion activities and the accuracies of the motion estimation scheme associated with each wavelet. Therefore, the threshold could be chosen in terms of dynamic range and the level in the pyramid.

The thresholds are then subtracted from the remaining non-zero coefficients.

$$TW_m^k(i,j) = \begin{cases} W_m^k(i,j) - T_m & : \text{if } W_m^k(i,j) > T_m \\ 0 & : \text{if } W_m^k(i,j) \leq T_m \end{cases}$$

where $0 \leq i \leq X/2^m - 1$ and $0 \leq j \leq Y/2^m - 1$ and X and Y are the video frame sizes.

The next step is to scale the coefficients by a normalizing factor $D_m$ based on their levels in the pyramid. The choice of $D_m$ is based on the same principle stated in Section 4. A larger value $D_m$ corresponds to a coarser quantization. In the present invention $D_m = D_M 2^{M-m}$ is chosen, where $D_M$ is the normalization factor for $\{S_M, W_M^1, W_M^2, W_M^3\}$.

$$NTW_m^k(i,j) = TW_m^k(i,j)/D_M 2^{M-m}$$

After normalization, the values are rounded to the next integer values by:

$$RNTW_m^k(i,j) = \text{Integer}\{NTW_m^k(i,j) + 0.5\}$$

Then $RNTW_m^k(i,j)$ is entropy-coded and transmitted. At the receiver, the decoded values are inverse normalized, added to the threshold, and inverse transformed to reconstruct the image. This simple adaptive truncation process results in a variable bit rate but a nearly constant quality. For constant bit rate output, $D_m$ should be a function of the degree of buffer fullness at the output of the coder. Relating $D_m$ to the variance distribution of different wavelets should also improve performance.

D. Implementation:

The video coding system of the present invention was implemented in a video compression testbed including a digital video recorder which allows a real-time playback of 25 second recorded CCIR 601 digital video. The recorder is interfaced with a host machine where the compression software resides. A software simulation of the compression and decompression algorithms permitted reconstruction of the video segments for comparison with the original signal via a real-time playback. Therefore, an evaluation is possible of compression performance, quality degradation, and computational efficiency of different coding algorithms. The test sequences "CAR" which was used in the testbed is a full-motion interlaced color video sequence in CCIR 601 format.

Figure 5:
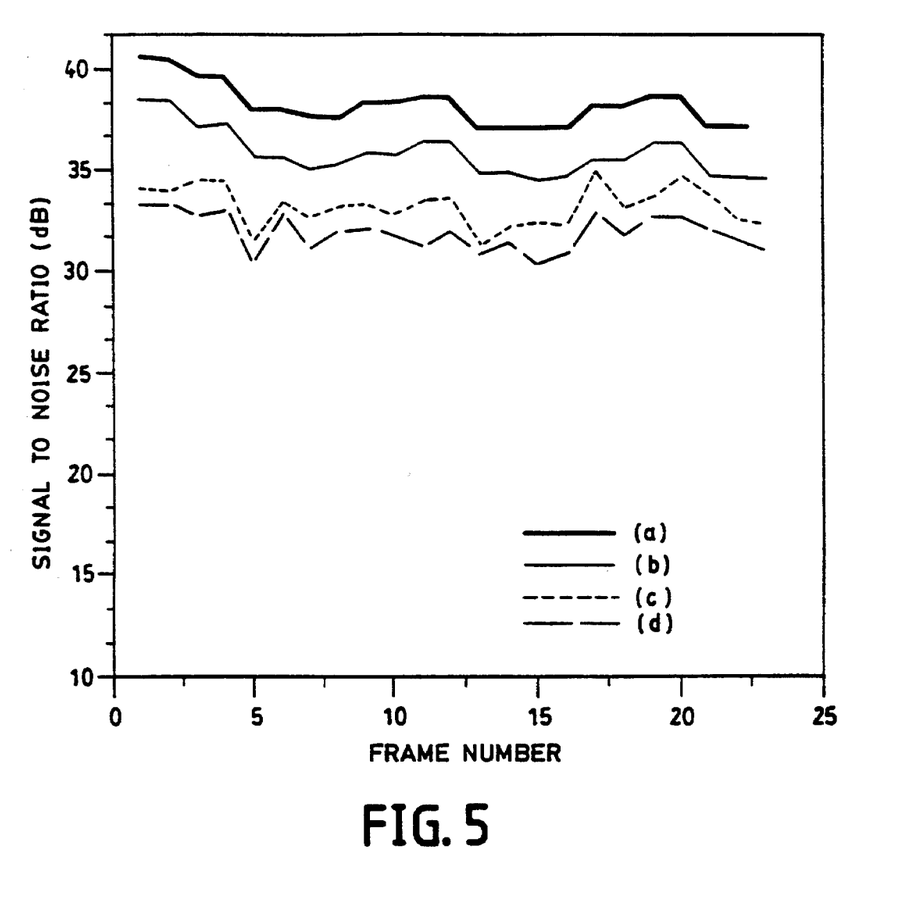
FIG. 5 illustrates S/N ratios for four implementations of the video compression scheme according to the present invention.

Each of the four different scenarios (a)–(d) of the proposed motion-compensated wavelet video compression scheme was tested. For schemes (a) and (b), the $\{S_8, W_8^i+\text{refine}\}$ MRMC scheme is used to find the motion vectors since it gives the best performance. The conventional full-search MC scheme using 8 by 8 blocks is employed in schemes (c) and (d). FIG. 5 illustrates the signal to noise ratio for these four scenarios. A normalizing factor $(D_M)$ of 8.0 for Y and 16.0 for U and V was used for schemes (a) and (c). For schemes (b) and (d) the same quantization tables as those used in the JPEG specifications are used to quantize the DCT coefficients.

FIG. 5 indicates that DWT working on the original video domain incorporated with the proposed MRMC scheme has a better performance than DWT operating on the DFD compensated by a conventional full-searching scheme. Moreover, the DCT mapping after DWT does not compact energies as one might expect for original video samples; rather, it has an inverse effect on the overall performance. Scheme (a) clearly out-performs all other variations. These observations are also supported by subjective evaluations. Scheme (a) and (c) are also free from the "blocking effect". We observe some "blocking effect" and other artifacts inherent to the block DCT approach when using (b) and (d), though they are not as pronounced as with a simple inter-frame block DCT scheme. This is due to the fact that the wavelet decomposition involves a global transform and hence randomly distributes the distortion among whole pictures, which is less annoying than the periodic "blocking effect" for human viewers.

Figure 6:
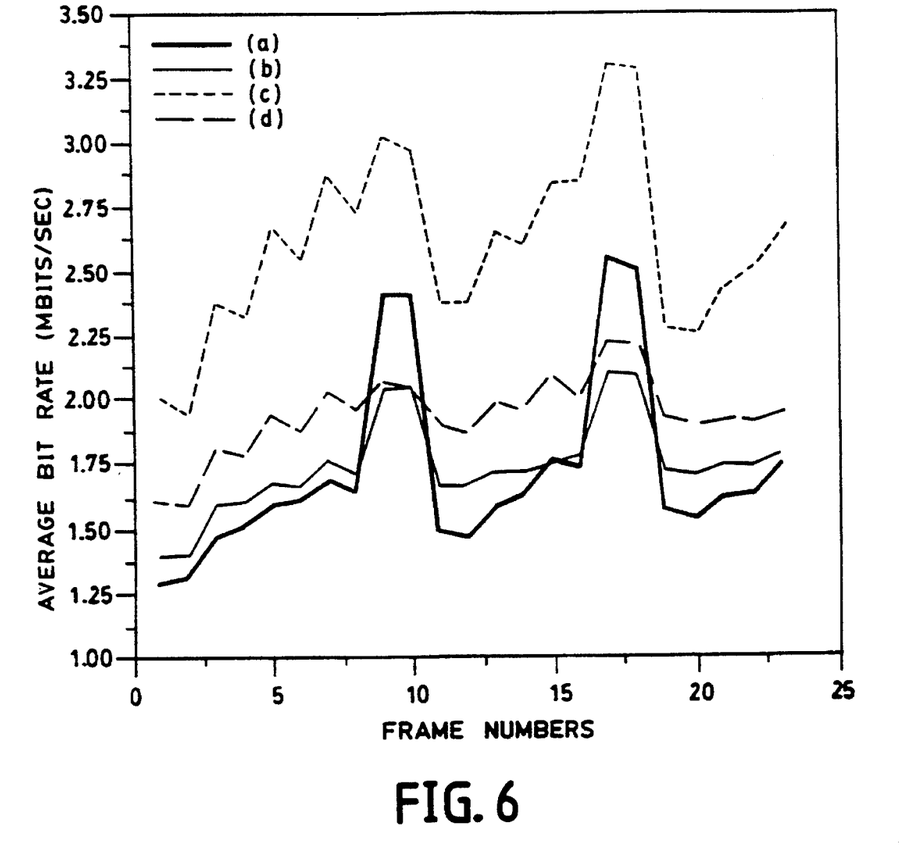
FIG. 6 shows bit rates for four implementations of the compression scheme according to the present invention.

FIG. 6 shows the average bit rate associated with above signal-to-noise ratios for four scenarios of the coding scheme with 30 fields/second by skipping every other field. It can be seen that bit rates results from (a) are lower than any other schemes. Note that the periodic high rate is a result of forced periodic refreshment.

While there has been shown and described herein what are presently considered the preferred embodiments of the invention, it will be obvious to those skilled in the art that various changes and modifications can be made therein without departing from the scope of the invention as defined by the appended claims.

We claim:

1. A method of coding a video signal frame f(t), comprising the steps of:

deriving a wavelet representation of a signal defined by a plurality of wavelets each corresponding to a subframe having a resolution;

estimating motion vectors for each of said plurality of wavelets to produce a set of displaced residual wavelets;

optimally assigning a given number of bits to each of said displaced residual wavelets to produce a respective bit map for each of aid displaced residual wavelets;

adaptively quantizing each of said displaced residual wavelets using its respective bit map; and coding each quantized displaced residual wavelet into a bit stream wherein the step of estimating motion vectors includes the steps of:

dividing each subframe into a see of blocks defining a grid, wherein the size of each block is based on the associated resolution of the respective subframe;

calculating a motion vector, relative to a previous frame, for each block of a lowest resolution subframe;

calculating motion vectors of each block of other subframes, comprising the steps of scaling a motion vector corresponding to a respective block of said lowest resolution subframe, and calculating a motion vector, relative to the previous frame, for a block under motion compensation using the scaled motion vector.

\* \* \* \* \*